United States Patent
Greenwald et al.

(10) Patent No.: US 11,148,573 B2
(45) Date of Patent: Oct. 19, 2021

(54) DEPLOYABLE FOOTREST FOR VEHICLE INTERIOR WITH A STORAGE COMPARTMENT

(71) Applicant: INTEVA PRODUCTS, LLC, Troy, MI (US)

(72) Inventors: Pamela S. Greenwald, Sterling Heights, MI (US); Aidano Nascimento, Jr., Oakland, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/260,923

(22) PCT Filed: Jul. 15, 2019

(86) PCT No.: PCT/US2019/041816
§ 371 (c)(1),
(2) Date: Jan. 15, 2021

(87) PCT Pub. No.: WO2020/018427
PCT Pub. Date: Jan. 23, 2020

(65) Prior Publication Data
US 2021/0245645 A1   Aug. 12, 2021

Related U.S. Application Data

(60) Provisional application No. 62/698,631, filed on Jul. 16, 2018.

(51) Int. Cl.
*B60R 13/02* (2006.01)
*B60N 3/06* (2006.01)
(Continued)

(52) U.S. Cl.
CPC ............ *B60N 3/06* (2013.01); *B60R 13/0243* (2013.01); *B29L 2031/3041* (2013.01); *B60R 7/06* (2013.01)

(58) Field of Classification Search
CPC ......... B60N 3/06; B60R 13/0243; B60R 7/06; B29L 2031/3041
(Continued)

(56) References Cited

U.S. PATENT DOCUMENTS 2,283,600 A * 5/1942 Dodson .................... B60N 3/06
280/727
5,352,020 A * 10/1994 Wade ..................... B60N 2/995
297/423.26
(Continued)

FOREIGN PATENT DOCUMENTS

| JP | 03067732 A | * | 3/1991 |
|---|---|---|---|
| JP | 2010000974 A | | 1/2010 |
| SU | 623766 A1 | | 9/1978 |

OTHER PUBLICATIONS

International Preliminary Report on Patentability for Application No. PCT/US2019/041816.
(Continued)

*Primary Examiner* — Pinel E Romain
(74) *Attorney, Agent, or Firm* — Cantor Colburn LLP

(57) ABSTRACT

A vehicle interior is disclosed herein. The vehicle interior having an interior trim panel; a footrest assembly operably coupled to the interior trim panel, the footrest assembly having: a deployable footrest positionable from a stowed position wherein the deployable footrest is not visually perceivable to a fully deployed position such that the footrest is accessible; a deployable mechanism that enables the footrest assembly to be manipulated between the stowed position and the fully deployed position; and a storage container integrated with the deployable footrest.

12 Claims, 2 Drawing Sheets

(51) Int. Cl.
*B29L 31/30* (2006.01)
*B60R 7/06* (2006.01)

(58) Field of Classification Search
USPC .................................. 296/146.7, 75
See application file for complete search history.

(56) References Cited

U.S. PATENT DOCUMENTS

| | | | | |
|---|---|---|---|---|
| 5,505,519 | A * | 4/1996 | Natt | B60N 2/28 |
| | | | | 297/250.1 |
| 6,241,301 | B1 * | 6/2001 | Speth | B60N 2/0232 |
| | | | | 180/90.6 |
| 7,404,568 | B1 * | 7/2008 | Portelance | B62K 5/01 |
| | | | | 280/291 |
| 7,571,964 | B2 * | 8/2009 | Taniguchi | B60N 2/995 |
| | | | | 297/423.36 |
| 7,641,266 | B2 * | 1/2010 | Platto | B60H 1/0055 |
| | | | | 296/193.06 |
| 9,738,238 | B2 * | 8/2017 | Bouillon | B60N 3/06 |
| 10,532,685 | B2 * | 1/2020 | Fitzpatrick | B60N 2/14 |
| 2014/0001787 | A1 * | 1/2014 | Miller | B60N 3/066 |
| | | | | 296/75 |
| 2014/0132040 | A1 | 5/2014 | Arakawa et al. | |
| 2016/0288669 | A1 * | 10/2016 | Woodhouse | B60N 2/22 |

OTHER PUBLICATIONS

International Search Report for Application No. PCT/US2019/041816.
Written Opinion for Application No. PCT/US2019/041816.

\* cited by examiner

DEPLOYABLE FOOTREST FOR VEHICLE INTERIOR WITH A STORAGE COMPARTMENT

CROSS REFERENCE TO RELATED APPLICATIONS

This application is a National Stage of PCT Application No. PCT/US2019/041816 filed on Jul. 15, 2019, which claims priority to the following U.S. Provisional Patent Application, Ser. No. 62/698,631 filed on Jul. 16, 2018 the contents each of which are incorporated herein by reference thereto.

BACKGROUND

Exemplary embodiments of the present disclosure pertain to the art of interior automotive trim in combination with a deployable footrest.

Vehicle interiors are constantly being improved to provide comfortable surroundings to the vehicle occupants.

Accordingly, it is desirable to provide an improvement to the interior trim of the vehicle.

BRIEF DESCRIPTION

Disclosed herein is a vehicle interior. The vehicle interior has an interior trim panel; a footrest assembly operably coupled to the interior trim panel, the footrest assembly having: a deployable footrest positionable from a stowed position wherein the deployable footrest is not visually perceivable to a fully deployed position such that the footrest is accessible; a deployable mechanism that enables the footrest assembly to be manipulated between the stowed position and the fully deployed position; and a storage container integrated with the deployable footrest.

In addition to one or more of the features described above, or as an alternative to any of the foregoing embodiments, the deployable mechanism is a multi-link mechanism.

In addition to one or more of the features described above, or as an alternative to any of the foregoing embodiments, the multi-link mechanism is a scissor lift.

In addition to one or more of the features described above, or as an alternative to any of the foregoing embodiments, the vehicle interior further includes a means to deploy the deployable footrest via a switch operably coupled to an actuator for operating the deployable mechanism, wherein the switch is located on a surface of an interior panel.

In addition to one or more of the features described above, or as an alternative to any of the foregoing embodiments, the interior trim panel is an instrument panel.

In addition to one or more of the features described above, or as an alternative to any of the foregoing embodiments, the interior trim panel is a door trim panel.

In addition to one or more of the features described above, or as an alternative to any of the foregoing embodiments, the interior trim panel is a console.

In addition to one or more of the features described above, or as an alternative to any of the foregoing embodiments, the deployable footrest is positionable into a first position which is located between the stowed position and the fully deployed position, wherein when the deployable footrest is in the first position the storage container is accessible.

In addition to one or more of the features described above, or as an alternative to any of the foregoing embodiments, the storage container is large enough to house a pair of shoes.

In addition to one or more of the features described above, or as an alternative to any of the foregoing embodiments, the storage container is operably coupled to a heating and ventilation system that supplies heated or cooled air to the storage container.

In addition to one or more of the features described above, or as an alternative to any of the foregoing embodiments, the heating and ventilation system is operably coupled to an existing heating and ventilation system of the vehicle.

In addition to one or more of the features described above, or as an alternative to any of the foregoing embodiments, the deployable footrest includes a massaging device and/or a ventilation opening.

In addition to one or more of the features described above, or as an alternative to any of the foregoing embodiments, the ventilation opening is operably coupled to an existing heating and ventilation system of the vehicle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
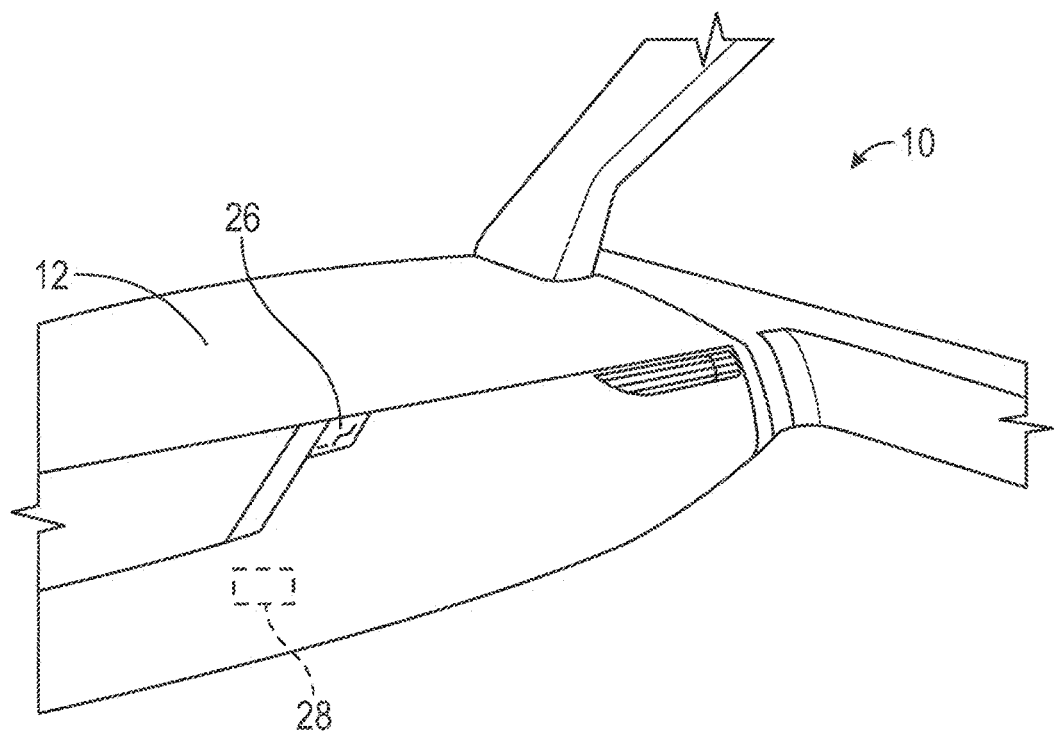
FIG. 1 is a perspective view of a portion of a vehicle interior.

FIG. 1 is a perspective view of a portion of a vehicle interior 10. The vehicle interior may have interior trim panels such as an instrument panel 12, which in one embodiment extends across a width of a vehicle or between a pair of pillars of the vehicle frame in a cross car direction. In the one embodiment, the instrument panel 12 is provided with a deployable footrest 14 that can be manipulated from a stowed position illustrated in FIG. 1, wherein the footrest 14 is not visually perceivable to a fully deployed position (illustrated in at least FIG. 3) where a user can rest their feet thereon.

In the illustrated embodiment, the footrest 14 is located under the instrument panel 12 in the passenger side of the vehicle. However and in accordance with various embodiments of the present disclosure the footrest 14 may be located in any suitable location of the vehicle (e.g., side doors, rear seats, rear compartments, driver's side, etc.). Furthermore, the footrest 14 may be associated with any interior trim panels of the vehicle.

The footrest 14 is comprised of at least two sides. A first side 16 which is the footrest side where the occupant can rest their feet and a second side 18 that is a personal storage side where objects can be placed and stowed for use by the occupant for convenience, for example.

The footrest 14 is a part of a footrest assembly 20 that includes a deployable mechanism 22 which enables the footrest assembly 20 to be in a plurality of positions, which include but are not limited to the following: a stowed position wherein the entire assembly is stored out of sight from the occupant(s) (FIG. 1); a first deployed position (FIG. 2) wherein a storage container 24 of the footrest assembly 20 is accessible; and a fully deployed or second position wherein the footrest 14 is in a fully deployed position (FIG. 3) such that an occupant may place their belongings in the storage container 24. In one embodiment, the storage container is integral or integrated with the footrest 14. In one embodiment, the deployable mechanism 22 is a multi-link mechanism such as a scissor lift. Of course, other mechanisms are considered to be within the scope of various embodiments of the present disclosure. For example and in one non-limiting embodiment, a multi-piece mechanism such as a cam operated mechanism or any other equivalent device could perform the required movements of the deployable mechanism.

Figure 2:
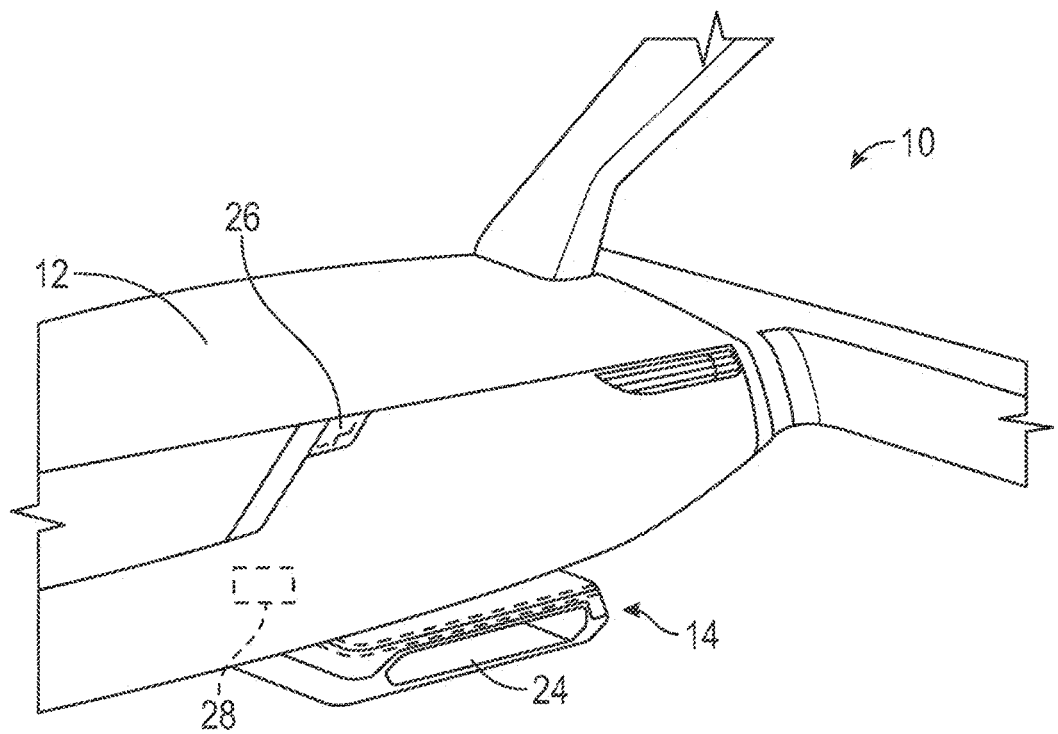
FIG. 2 is a perspective view of the portion of the vehicle interior illustrated in FIG. 1 with a footrest in a partially deployed position.
Figure 3:
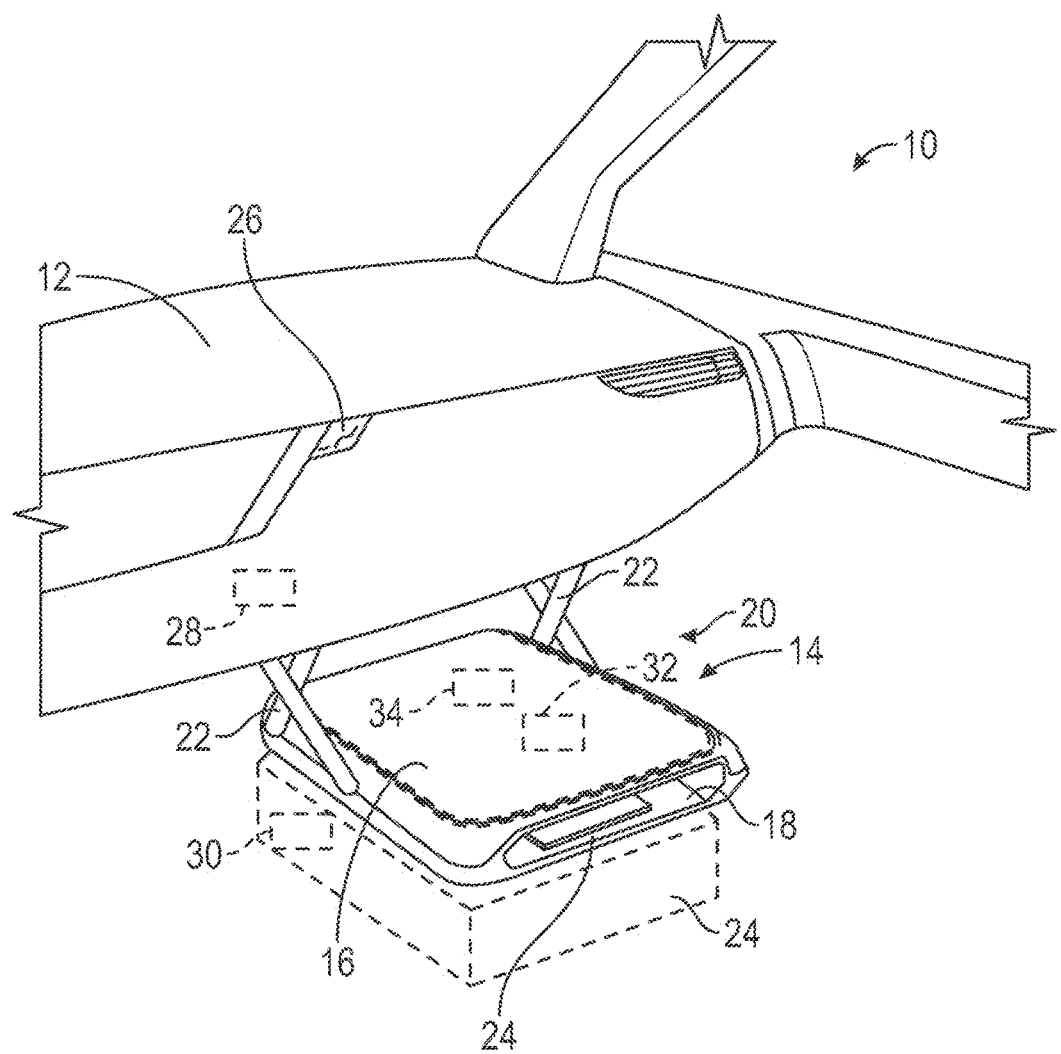
FIG. 3 is a perspective view of the portion of the vehicle interior with the footrest in a fully deployed position.

As illustrated in at least FIGS. 2 and 3, the footrest 14 can be positioned in many different positions to enable occupant comfort and offer the occupant personal storage. In one embodiment, the footrest assembly 20 may be positioned between the stowed position, the first position and the second position through actuation of the deployable mechanism 22 via operation of a switch 26 that is operably coupled to an actuator or motor 28 illustrated by the dashed lines that will operate the deployable mechanism 22 in order to position the footrest assembly 20 between the stowed position, the first position and the second position.

In one embodiment, the switch 26 is located on a surface of the instrument panel 12. However, the switch 26 may be located on other interior panels of the vehicle such as a door trim panel or console (center or other location).

In one embodiment and as illustrated by the dashed lines in FIG. 3, the storage container 24 is large enough to house a pair of shoes of an occupant. In this embodiment, a user upon entering the vehicle may place their shoes in the container 24. As such, an occupant of the vehicle may store their shoes in the vehicle especially if they are soiled or dirty such that the shoes may not soil the interior of the vehicle.

In accordance with various embodiments of the present disclosure, the footrest assembly can provide at least two functions. Function 1 is to provide a surface for occupants to rest their feet and function 2 is to provide for integrated personal storage within the footrest assembly for the occupant. This can be accomplished in a plurality of ways. One non-limiting means for accomplishing this is to have two (2) sides wherein one side (side A) is the footrest side where the occupant can rest their feet and the other side (side B), which can be opposite to the first side is a personal storage side where objects can be placed and stowed for use by the occupant for convenience. Another method is to have the personal storage area under the footrest area and always accessible to the occupant when the assembly is in a deployed position.

The footrest assembly may be connected to a deployable mechanism that enables the assembly to be positioned in multiple positions.

In yet another alternative embodiment and in combination with any of the aforementioned embodiments, the storage container 24 may be equipped with or operably coupled to a heating and ventilation system 30 that supplies heated or cooled air to the storage container 24 in order to dry or cool items placed therein. The heating and ventilation system 30 may also be used to remove moisture or odors from objects placed in the container. In one non-limiting embodiment, the storage container may be in fluid communication with the vehicle's existing heating and ventilation system thus only a conduit need to be provided to couple the storage container 24 to the existing heating and ventilation system.

In yet another alternative embodiment and in combination with any of the aforementioned embodiments, the footrest 14 may be equipped with a massaging device 32 and/or a ventilation opening 34. In order to provide further enhancements to the footrest 14. In one embodiment, the ventilation opening 34 may be operably coupled to the aforementioned heating and ventilation system 30, which in one embodiment may be in fluid communication with the vehicle's existing heating and ventilation system or the ventilation opening 34 could be operably coupled to a standalone unit.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle interior, comprising:
   an interior trim panel;
   a footrest assembly operably coupled to the interior trim panel, the footrest assembly comprising:
      a deployable footrest positionable from a stowed position wherein the deployable footrest is not visually perceivable to a fully deployed position such that the deployable footrest is accessible;
      a deployable mechanism that enables the deployable footrest to be manipulated between at least the stowed position and the fully deployed position; and
      a storage container integrated with the deployable footrest.

2. The vehicle interior as in claim 1, wherein the deployable mechanism is a multi-link mechanism.

3. The vehicle interior as in claim 2, wherein the multi-link mechanism is a scissor lift.

4. The vehicle interior as in claim 1, further comprising a mechanism to deploy the deployable footrest via a switch operably coupled to an actuator for operating the deployable mechanism, wherein the switch is located on a surface of the interior trim panel of the vehicle interior.

5. The vehicle interior as in claim 4, wherein the interior trim panel is one of an instrument panel, a door trim panel, and a console.

6. The vehicle interior as in claim 1, wherein the deployable footrest is positionable into a first position which is located between the stowed position and the fully deployed position, wherein when the deployable footrest is in the first position the storage container is accessible.

7. The vehicle interior as in claim 1, wherein the interior trim panel is one of an instrument panel, a door trim panel, and a console.

8. The vehicle interior as in claim 1, wherein the storage container is large enough to house a pair of shoes.

9. The vehicle interior as in claim 1, wherein the storage container is operably coupled to a heating and ventilation system that supplies heated or cooled air to the storage container.

10. The vehicle interior as in claim 9, wherein the heating and ventilation system is operably coupled to an existing heating and ventilation system of the vehicle.

11. The vehicle interior as in claim 1, wherein the deployable footrest includes a massaging device and/or a ventilation opening.

12. The vehicle interior as in claim 11, wherein the ventilation opening is operably coupled to an existing heating and ventilation system of the vehicle.

\* \* \* \* \*